US006457507B1

(12) United States Patent
Kubota

(10) Patent No.: US 6,457,507 B1
(45) Date of Patent: Oct. 1, 2002

(54) SEPARATOR FOR A PRINTING LAMINATE

(75) Inventor: Tetsuo Kubota, Tokyo (JP)

(73) Assignee: Casio Computer Co. Ltd., Tokyo (JP)

( * ) Notice: Subject to any disclaimer, the term of this patent is extended or adjusted under 35 U.S.C. 154(b) by 0 days.

(21) Appl. No.: 09/673,485

(22) PCT Filed: Feb. 28, 2000

(86) PCT No.: PCT/JP00/01138

§ 371 (c)(1), (2), (4) Date: Oct. 12, 2000

§ 102(e) Date: Oct. 12, 2000

(87) PCT Pub. No.: WO00/51891

PCT Pub. Date: Sep. 8, 2000

(30) Foreign Application Priority Data

Mar. 1, 1999 (JP) .......................................... 11-052109

(51) Int. Cl.[7] ................................................ B32B 35/00

(52) U.S. Cl. ....................................... 156/584; 156/344

(58) Field of Search ................................ 156/344, 584; 271/280, 281, 285, 286

(56) References Cited

U.S. PATENT DOCUMENTS

| | | | | |
|---|---|---|---|---|
| 3,936,343 A | * | 2/1976 | Walls | 156/368 |
| 4,173,510 A | * | 11/1979 | Tobey | 156/344 |
| 4,216,048 A | * | 8/1980 | Gehweiler | 156/344 |
| 4,855,012 A | * | 8/1989 | Sumi | 156/344 |
| 5,169,475 A | * | 12/1992 | Tobin | 156/344 |
| 5,478,428 A | | 12/1995 | Carpenter | |
| 5,545,282 A | * | 8/1996 | Bechmann | 156/248 |
| 5,653,850 A | * | 8/1997 | Watanabe | 156/344 |
| 5,656,127 A | * | 8/1997 | De Niel et al. | 156/344 |

FOREIGN PATENT DOCUMENTS

| | | |
|---|---|---|
| EP | 0 286 961 | 10/1988 |
| EP | 0 703 151 A2 | 3/1996 |
| EP | 0 726 222 A2 | 8/1996 |
| GB | 2 012 731 | 8/1979 |

* cited by examiner

*Primary Examiner*—Mark A. Osele

(74) *Attorney, Agent, or Firm*—Frishauf, Holtz, Goodman & Chick, P.C.

(57) ABSTRACT

In a separator, a seesaw cover is pressed downward at its rear end to turn the seesaw cover counterclockwise to form an open mouth. A label comprising a printing tape and a cover tape attached through an adhesive layer o the printing tape is inserted at one end into the open mouth. The seesaw cover is released from the push force applied from above to its end opposite to the mouth, the cover is returned to its original position by the resiliency of a spring, and the label is then clamped at one end by elastic members within the mouth. When a push button is pressed downward, a pair of sliding contact surfaces thereof slide on a corresponding pair of sliding contact surfaces of a moving member to thereby move the moving member toward the mouth. This causes a curved member provided at a mouth-side end of the moving member and hence its curved member surface to curve a corner of the label. When the pushing and releasing operations of the push button are repeated several times and then the label is taken out, the cover tape and the printing tape of the printing laminate label are separated from each other at the corner.

8 Claims, 11 Drawing Sheets

SEPARATOR FOR A PRINTING LAMINATE

TECHNICAL FIELD

The present invention relates to separators for separating a cover sheet from a printing laminate which includes a printing sheet and the cover sheet attached through an adhesive layer to the printing sheet.

BACKGROUND ART

Conventionally, tape-like printing laminates which each include a printing sheet or tape of a resin material to which a print ink can easily take well and a cover sheet or tape of paper coated with separating silicon attached through an adhesive layer to the printing sheet or tape are used as printing mediums for tape printers.

Various such printing laminates are prepared which have a width of about 1–5 cm, on which printing tape a character string is printed by a tape printer, and its printed portion is then cut to a predetermined length away from the remaining portion of the tape to form a label. Then, the cover tape is separated from the label and the printed tape portion is then pasted at its exposed adhesive layer to an object.

Since the cover tape has the silicon coating thereon, it is separable from the adhesive layer of the label. However, it is undesirable that the cover tape is easily separated from the printing sheet or tape during handling before printing. Thus, the cover tape is required to be pasted to the adhesive layer with such a pasting force that the cover tape can not be separated easily from the printing tape. Therefore, even when the cover tape is tried to be separated from the label at its corner with fingers, it is considerably difficult to do so well.

In order to facilitate separation of the cover tape from the label, separators have been put to practical use. The separators have a propeller-like rotating body which is rotated by a motor to vehemently hit a corner of the label to thereby give a bending habit to the label at the corner such that the cover tape can be easily separated with fingers from the remainder of the label.

FIG. 11 shows a separator having a simpler structure which has been used actually. FIGS. 12A, B and C show the states of its use. As shown in FIG. 11, the separator 1 has a resin body 2 of a hollow truncated conical shape with a bottom formed at its smaller end and with a slit 3 extending along a ridgeline thereof.

In use, as shown in FIG. 12A, the label 4 is then inserted at one end through the slit 3 into the separator 1 so as to abut on an inner surface 2*a* of the separator body. The label 4 is then pinched externally at its lower portion 5 near the slit 3 with fingers and slid downward, as shown by an arrow A.

As shown in FIG. 12B, this causes an end of the label 4 to be pressed and rolled up by the tapering hollow inner surface 2*a* of the separator. Then, the label is pulled upward which allows the rolled-up end of the label 4 to restore its original straightened state with its elasticity. Then, the downward and upward operations of the label 4 in FIGS. 12A and B are repeated. Lastly, when the label 4 is taken out from the separator 1, as shown in FIG. 12C, the label 4 is separated at its end into the printing tape 6 and cover tape 7. Thus, the cover tape 7 can easily be separated with fingers from the printing tape 6.

Each of the method of separating the cover tape by vehemently hitting the corner of the label with the propeller-like rotating body and the method of using the truncated conical-shaped separator 1 of FIG. 11 to separate the cover tape from the remaining printing laminate tape uses a difference in deformation between the printing tape 6 and the cover tape 7. The cover tape 7 has a low elasticity, so that it tends to maintain a bend given by an external force whereas the printing tape 6 has a somewhat higher elasticity because of its resin material to thereby restore its original state easily against its applied bending force.

The outer and inner peripheries of the printing laminate 6 to which a bending force is applied have different radii of curvature, so that each time the printing laminate 6 is bent, the printing laminate 6 and the cover tape 7 are impressed with shearing stresses. This causes the adhering force between the adhesive layer and the cover tape 7 to decrease. Further, a separating force acts between the printing tape 6 and the cover tape 7 due to the difference in their deformations, which leads to separation of the cover tape 7 and the printing tape 6, to which the bending force was applied, from each other at their corner.

The above-mentioned method of vehemently hitting the corner of the label uses an expensive large-scaled propeller-like rotating body. The method of using the truncated conical-shaped separator 1 cannot be easily performed because the label 4 is required to be pinched externally with fingers at its lower portion near the slit 3 in the conical-shaped separator body so as not to be slipped off from the slit while repeating the downward and upward movements of the label 4. Therefore, an unskillful user cannot maintain pinching the lower label portion 5 with fingers close to the slit 3, and cannot cause the label 4 to slide at its end on the inner surface 2*a* of the separator body and hence the label 4 can not be bent at its corner.

DISCLOSURE OF INVENTION

It is therefore an object of the present invention to provide a separator having a simple structure which is capable of easily separating a cover sheet from a printing laminate.

In order to achieve the above object, the present invention provides a separator for separating a cover sheet from a printing laminate which includes a printing sheet and the cover sheet attached separably to the printing sheet, comprising: mouth means through which the printing laminate is inserted; curved means having a curved surface provided deep within the mouth means; and moving means for moving the curved means toward the mouth means to cause the curved means to push at the curved surface a leading end of the inserted printing laminate to thereby curve the printing laminate.

According to the separator, the printing laminate is fixed always appropriately at a position where its cover sheet is separated from its printing sheet, and the printing laminate is thrusted at the leading end by the curving means in a direction reverse to the inserting direction of the printing laminate. Thus, the separator is easy to handle as well as even an unskillful user can surely form a desired bend habit surely at the end of the printing laminate. Separation of the cover sheet from the composite is facilitated.

The separator may further comprise clamping means for clamping the printing laminate at a predetermined position. The separator may also further comprise biasing means for biasing the clamping means toward the predetermined position so as to clamp the printing laminate at the predetermined position.

The moving means may comprise a moving member and an operative member operated for moving the moving member and caracterized in that the moving member moves at about 90 degrees to a direction in which the operative member is operated. The operative member may comprise a sliding surface where the operative member is in contact with the moving member such that a force applied to the operative member is converted by the sliding surface of the operative member to a force applied to the moving member so as to move the moving member toward the leading end of the printing laminate, the force applied to the operative member being at about 90 degrees to the direction of the force applied to the moving member.

The moving member may comprise an operative member and a moving member integral with the operative member, and caracterized in that the operative member and the moving member have the same moving direction.

The moving member may be integral with the curved means. The mouth means may comprise a pair of guides for guiding the printing laminate and disposed at an angle of 30–60 degrees to the direction in which the printing laminate is inserted at the leading end into the mouth means.

BEST MODE FOR CARRYING OUT THE INVENTION

Figure 1:
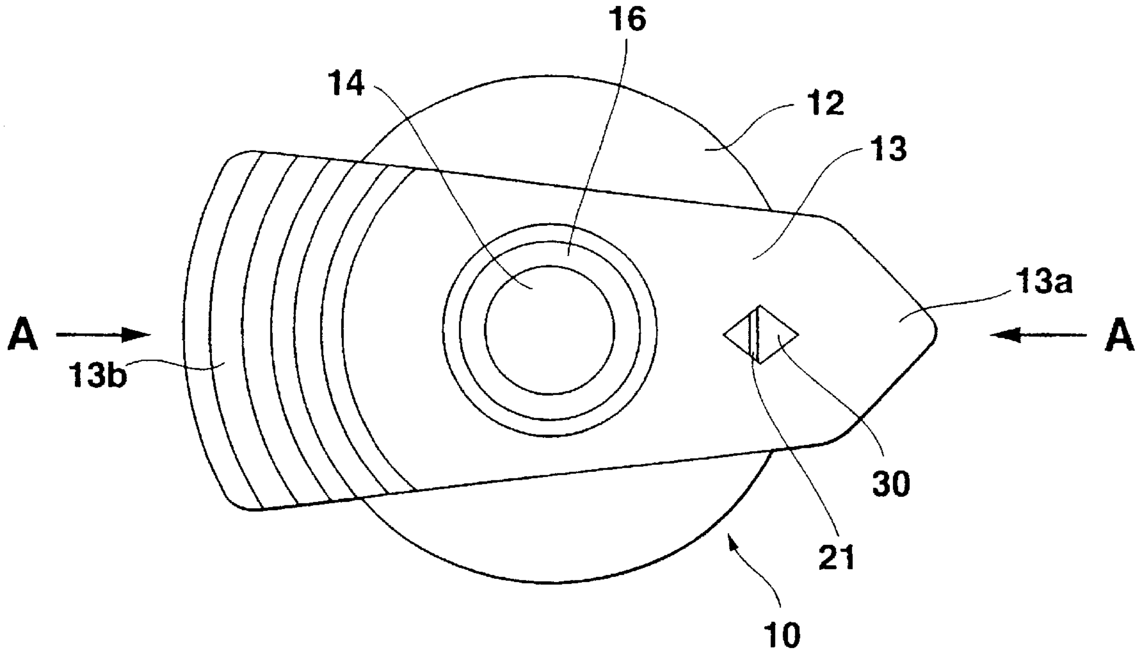
FIG. 1 is a plan view of a separator as one embodiment of the present invention.
Figure 2:
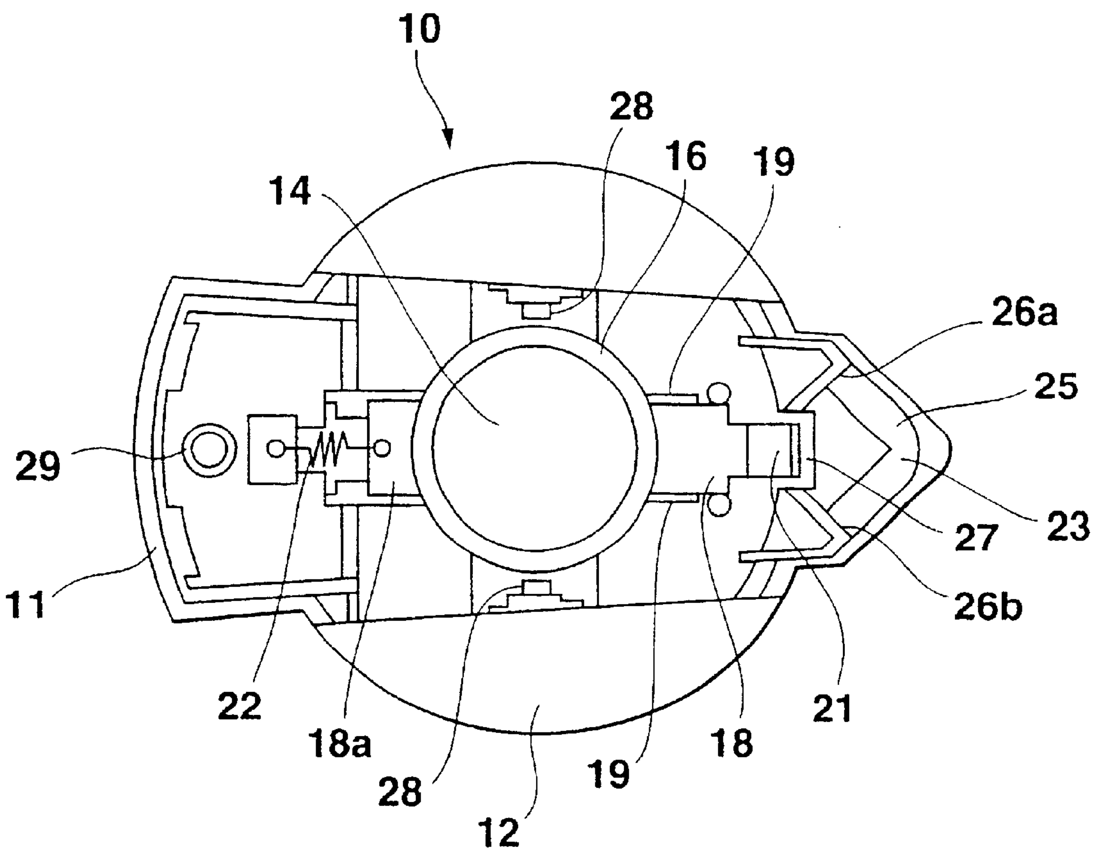
FIG. 2 is a plan view of the separator with a seesaw cover being removed away to show its internal structure.
Figure 3:
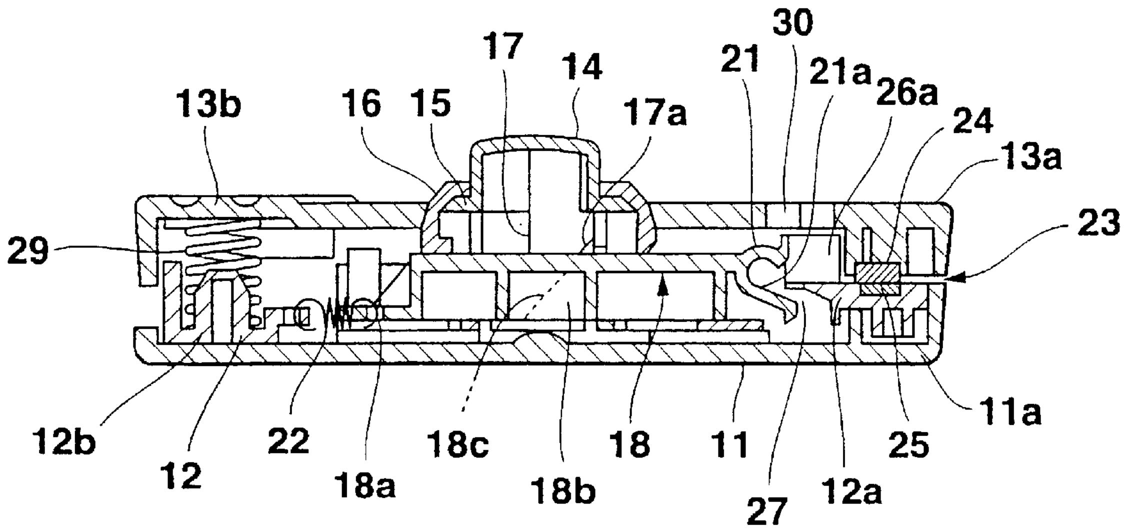
FIG. 3 is a cross-sectional view taken along a line A—A of FIG. 1.

An embodiment of the inventive separator 10 will be described with reference to the accompanying drawings. As shown in FIGS. 1–3, the inventive separator 10 includes a lower case 11, an upper case 12 fixed to the lower case 11, a seesaw cover 13 which covers the lower and upper cases 11 and 12, and a cylindrical push button 14 which protrudes upward from a hole formed at a center of the seesaw cover 13.

The push button 14 abuts from below on a reduced upper open end of a hollow-cylindrical push button holder 16 provided at the center of the upper case 12 at a shoulder of its cylindrical body formed at a mid-height thereof such that the push button 14 is inhibited from slipping off upward. The push button 14 has a pair of plate-like legs 17 each provided on a respective one of both sides thereof. The pair of legs 17 each have a lower surface 17*a* inclined at about 45 degrees from its lower left end to its upper right end in FIG. 3 so as to form an inclined downward sliding surface 17*a,* which is best illustrated in FIGS. 6A and B.

A horizontally moving assembly 18 is disposed between the pair of legs 17 so as to be guided forward or rightward and backward or leftward in FIGS. 1–3 along a pair of guide rails 19 each provided on a respective one of both sides of the moving assembly 18. The moving assembly 18 has a curved member 21 at the forward or rightward end thereof. A helical pull spring 22 is provided between the backward or leftward end 18*a* of the moving assembly 18 and the upper case 12, so that the moving assembly 18 is biased always backward or leftward in FIGS. 1–3 so as to stop at its initial position.

The moving assembly 18 has a pair of inclined upward sliding surfaces 18*c* extending at about 45 degrees from its lower backward or leftward end to an upper forward or rightward end in FIG. 3, and each provided on a respective one of both sides of the moving assembly 18 at a midpoint of its length. The pair of inclined downward sliding surfaces 17*a* of the push button 14 always abut by the weights of the plate-like legs 17 on the corresponding pair of inclined upward sliding surfaces 18*c*. In other words, the moving assembly 18 always biases the push button 14 upward through the pair of upward sliding surfaces 18*c* of the moving assembly 18 and the pair of downward sliding surfaces 17*a* of the push button 14 abutting always on the sliding surfaces 18c thereof due to the backward or leftward resiliency of the helical pull spring 22. When no operative force is applied to the push button 14, the push button is biased upwards by the pull spring 22. Thus, the push button 14 abuts at its flange 15 on the reduced open end of the button holder 16 and held at its initial position with its head extruding upward from the button holder 16.

Figure 6A:
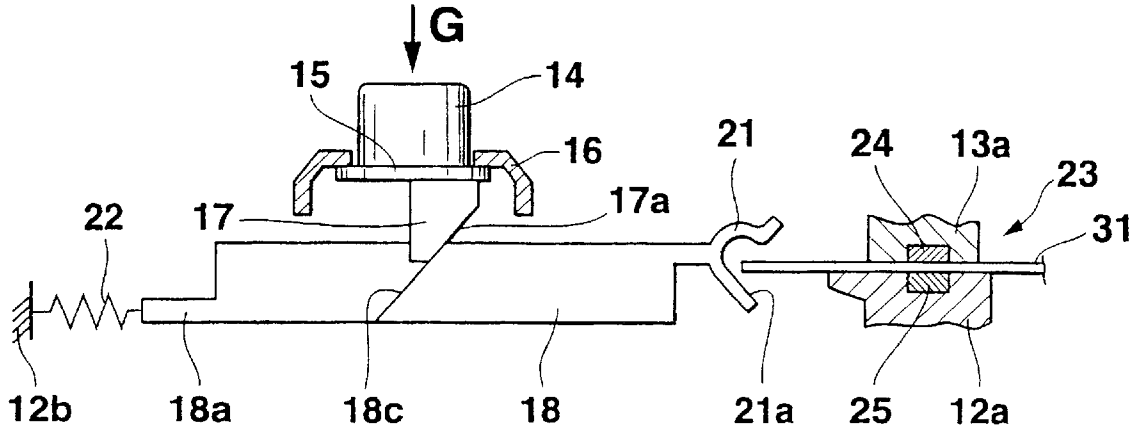
FIGS. 6A and B illustrate sequential separating operations performed by the separator.

By pushing the push button 14 downward in the state of FIG. 6A, the pair of downward sliding surfaces 17*a* of the push button 14 are lowered to thereby move forwards rightward or in a direction to displace the pair of sliding surfaces 18*c* of the moving assembly 18 the pair of upward sliding surfaces 18*c* of the moving assembly 18 abutting on the pair of downward sliding surfaces 17*a* of the push button 14. Thus, the moving assembly 18 and hence the curved member 21 are moved forwards or rightward against the resiliency force of the helical pull spring 22. In this case, the button 14 can be pressed until the lower surface of the push-button flange 15 abuts on an upper surface of the moving assembly 18.

When the push button 14 is released from its push operation, the pair of upward sliding surfaces 18*c* of the moving assembly 18 move the corresponding pair of downward sliding surfaces 17*a* of the push button 14 upward or in a direction in which the pair of downward sliding surfaces 17*a* of the push button 14 are displaced to thereby return the push button 14 to its initial position where the push button 14 protrudes at its head upwards.

As described above, in the present embodiment, the moving direction of the moving assembly 18 is arranged to be at about 90 degrees to the operating direction of the push button 14.

As shown in FIGS. 2 and 3, the separator 10 has at its forward or rightward end the mouth 23 which is formed by a forward or rightward end 13*a* of the seesaw cover 13 and a forward or rightward end 12*a* of the upper case 12 (a forward or rightward end 11*a* of the lower case 11) into which the printing laminate label is inserted. Elastic (rubber) members 24 and 25 are provided on a lower surface of the seesaw cover 13 and an upper surface of the upper case 12, respectively, within the mouth 23.

A pair of upstanding guides 26*a* and 26*b* having a V-shape as viewed in a plan view of FIG. 2 and open at about 90 degrees are provided on an upper surface of the forward or rightward end 12*a* of the upper case 12 after the mouth 23 such that the label can be easily inserted between the pair of guides 26*a* and 26*b*. The pair of guides 26*a* and 26*b* are spaced by a gap 27 at their backward or leftward ends in which gap 27 the curved member 21 is disposed such that its curved surface 21*a* is open to the mouth.

While the pair of guides 26*a* and 26*b* are each disposed at 45 degrees to the longitudinal center line of the separator, the pair of guides 26*a* and 26*b* can easily guide the label at one corner into the curved member 21 as long as the angle at which each guide plate 26*a* or 26*b* is arranged to the center line is in a range of 30–60 degrees. In this case, the pair of guides 26*a* and 26*b* should be about 90 degrees to each other.

The seesaw cover 13 is supported seesawably by a pair of pivots 28 each provided at a midpoint of a respective one of both the sides of the upper case 12 and received in a corresponding pair of holes each provided on a respective one of both the sides of the seesaw cover 13. The backward or leftward end 13*b* of the seesaw cover 13 has a corrugated area thereon.

A helical push spring 29 is provided between the seesaw cover 13 and the upper case 12 at their backward or leftward ends 13*b* and 12*b* such that the push spring 29 always biases the cover 13 upward at its backward or leftward end 13*b* thereby to turn the seesaw cover 13 clockwise around the pair of pivots 28 in FIG. 3. Therefore, the seesaw cover 13 is always biased clockwise around the pair of pivots 28 such that the elastic member 24 on the cover 13 presses, and hence is in cross contact with, the elastic member 25 on the forward or rightward end 12*a* of the upper case 12. Thus, when the label is inserted into the mouth 23, it is clamped between the forward or rightward ends 13*a* and 12*a* of the cover 13 and the upper case 12, respectively.

The seesaw cover 13 has a window 30 on its forward or rightward end 13*a* through which the inside of the separator in the vicinity of the curved member 21 provided at the forward or rightward end of the moving assembly 18 is visible from the outside.

Figure 4A:
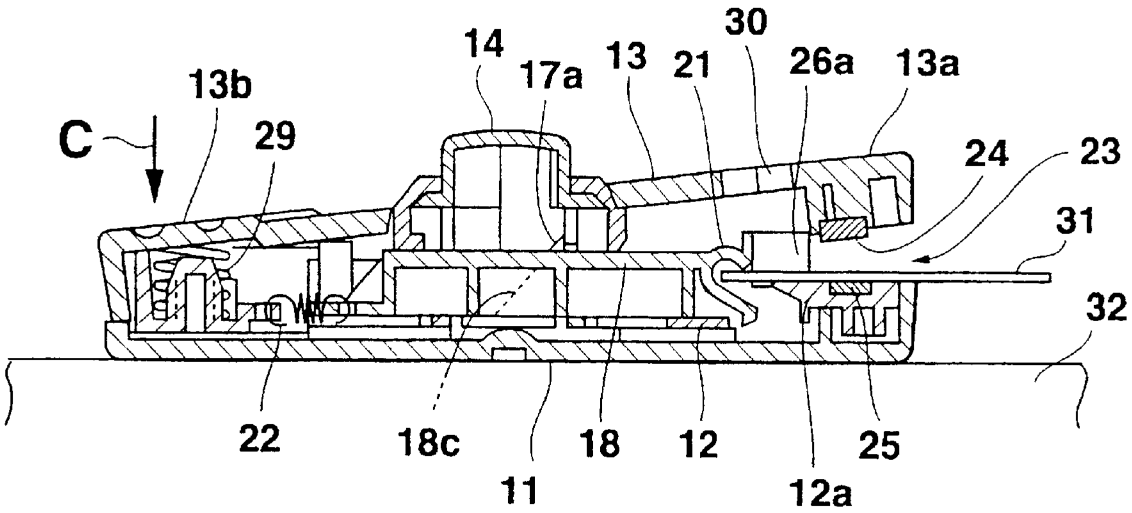
FIGS. 4A and B are cross-sectional views of the separator, showing a printing laminate label inserted into an open mouth of the separator and the printing laminate label held in a closed mouth of the separator, respectively.
Figure 4B:
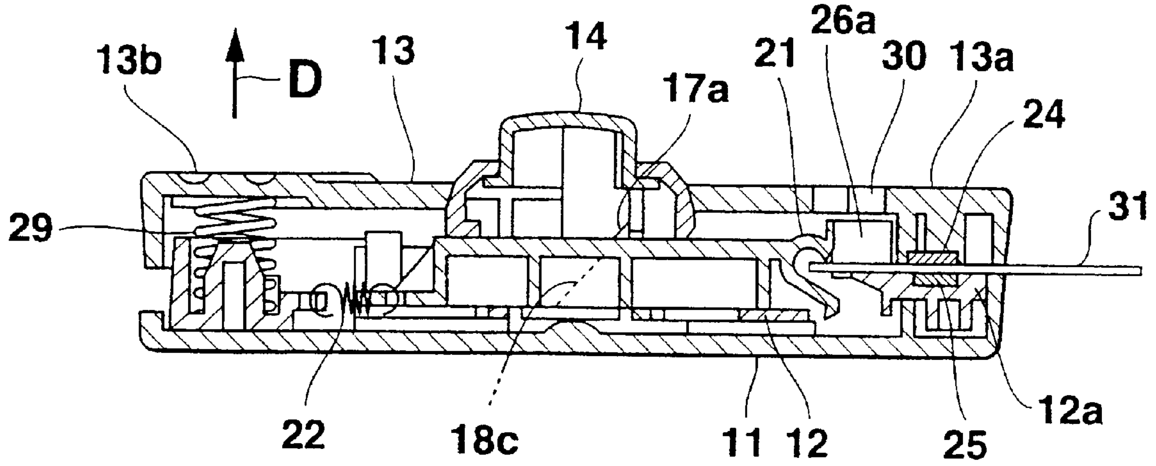
Figure 5:
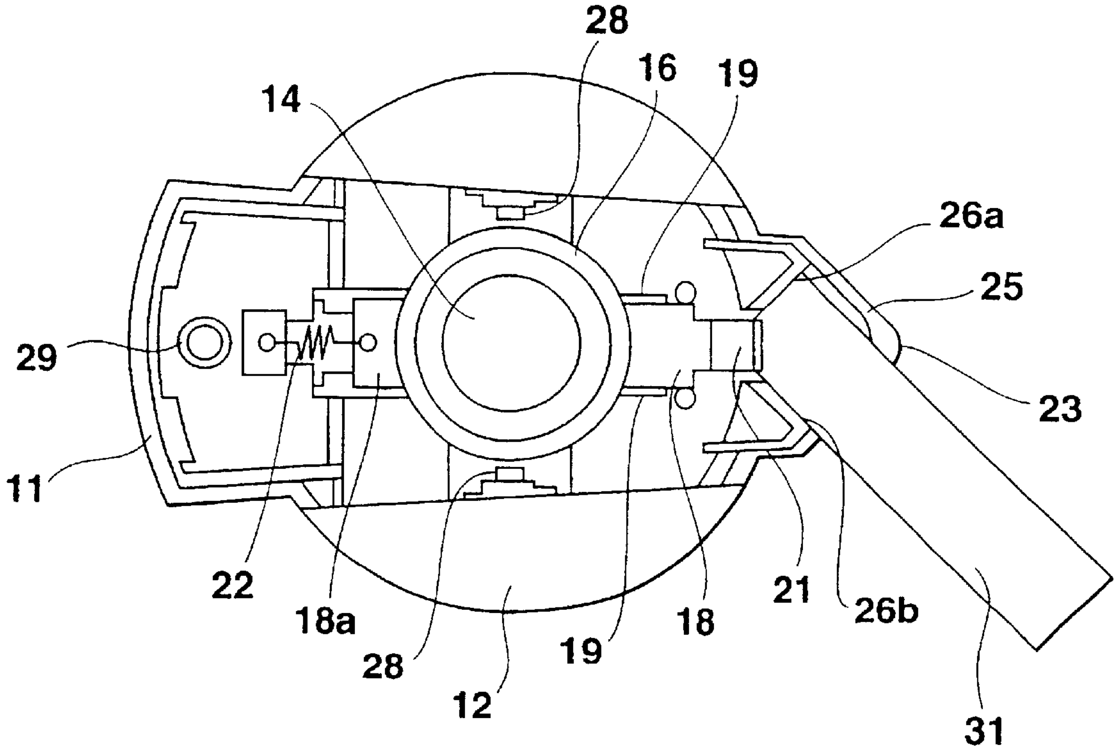
FIG. 5 is a plan view of the separator with the label being inserted at its end into the mouth and with the seesaw cover being removed away.

FIGS. 4A and B are cross-sectional views of the separator, showing the printing laminate labels inserted into the open and closed mouths, respectively, of the separator. FIG. 5 is a plan view of the separator with the label being inserted at one end into the mouth and with the seesaw cover being removed away. First, as shown in FIG. 4A, the separator 10 is placed on a flat top surface, for example, of a desk 32 or is simply held by a hand. Then, the seesaw cover 13 is pushed downward at its corrugated area on its backward or leftward end 13*b,* as shown by an arrow C in FIG. 4A. This causes the seesaw cover 13 is turned counterclockwise around the pair of pivots 28 against the resiliency of the helical push spring 29.

Thus, the mouth 23 is opened, and the elastic member 24 on the cover 13 is moved away from the elastic member 25 on the upper case 12 to open a label insertion path within the mouth 23. In this state, the label 31 is inserted at one end into the open mouth 23. In that case, as shown in FIG. 5, the pair of guides 26*a* and 26*b* guide the inserted label 31 at one corner along the center line of the insertion path to a backward or leftward end of the label insert path and stop the label there. At this time, the label 31 is close at its corner to the curved member 21 provided at the forward or rightward end of the moving assembly 18 after the pair of guides 26*a* and 26*b*.

When the push force applied from above to the rear end 13*b* of the seesaw cover 13 is released, the seesaw cover 13 is turned clockwise around the pair of pivots 28 by the resiliency of the helical push spring 29 acting in the direction of an arrow D to close the mouth 23 whereby the elastic member 24 on the seesaw cover 13 is pressed against the corresponding elastic member 35 on the upper case 12. Thus, the label 3 is pinched and clamped at its corner by the elastic members 24 and 25 within the mouth 23.

Alternatively, the seesaw cover 13 may be removed away from the separator in order to clamp or fix the label partially within the mouth 23. In that case, the label 31 is placed at one corner within the mouth 23 in the case 12, as shown in FIG. 5. The label 31 then may be pushed and fixed against the elastic member 25 with fingers to perform subsequent operations which will be described below.

In any event, the label 31 is guided by the pair of guides 26*a* and 26*b* to be held at all times at a proper position. That is, the fixed state of the label 31 does not change depending on the user.

Figure 7:
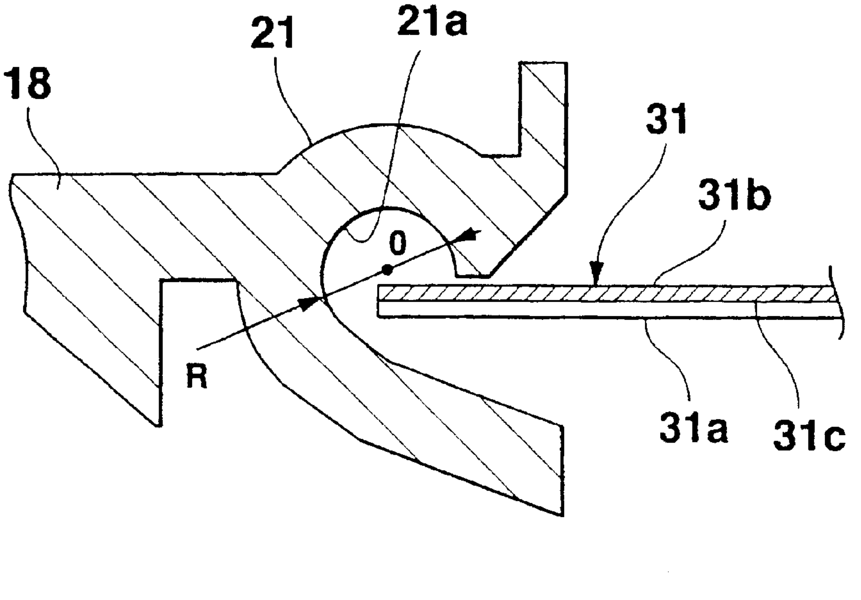
FIG. 7 illustrates in an enlarged view the relationship between a curved member and a label end in FIG. 6A.
Figure 12A:
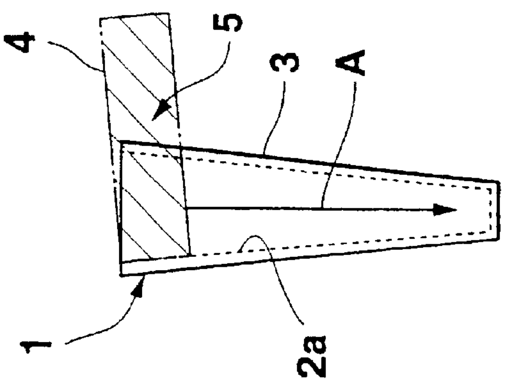
FIG.12A PRIOR ART
FIGS. 12A, B and C show sequential separating operations of the conventional separator.
Figure 12B:
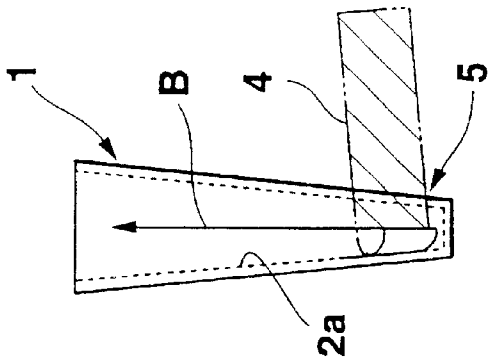
FIG.12B PRIOR ART
Figure 12C:
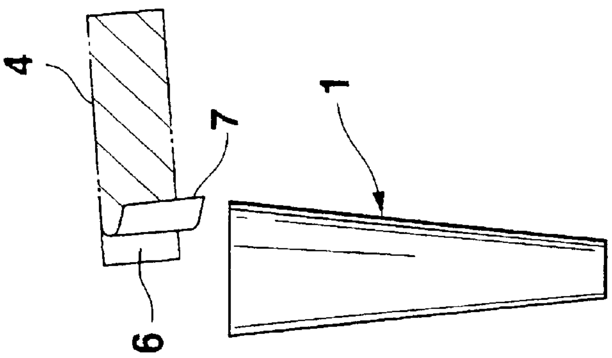
FIG.12C PRIOR ART

FIG. 7 illustrates in an enlarged view the relationship between the curved member 21 and the (laminate tape) label 31 end of FIG. 6A. The label 31 of FIGS. 4A and B and 5 has a composition similar to that of the label 4 of FIGS. 12A, B and C. That is, as shown in FIG. 7, the label 31 includes a printing tape 31*a* of a resin or PET (polyethylene terephthalate) tape, and a cover tape 31b of glassine paper attached through an adhesive layer 31*c* to the printing tape 31*a*. The label 31 is about 130 $\mu$ thick (the printing tape 31*a,* cover tape 31*b* and adhesive layer 31*c* are about 40, 75 and 15$\mu$, respectively).

In this label 31, the cover tape 31*b* has a low elasticity to maintain its bent state produced by an external force while the printing layer 31*a* of the resin material has a somewhat higher elasticity and is likely to restore its original state when the applied external force is released from it.

As shown in FIG. 7, the laminate label 31 is inserted at one end into the mouth 23 through a position somewhat below the center O of the opening of the curved member 21 and held close to the inner surface of the curved member 21 such that the printing tape 31*a* faces downward and the cover tape 31*b* faces upward, and held at the one end within the opening of the curved member 21. The curved surface 21*a* of the curved member 21 has a radius of curvature of about 0.8–1.4 mm.

Figure 6B:
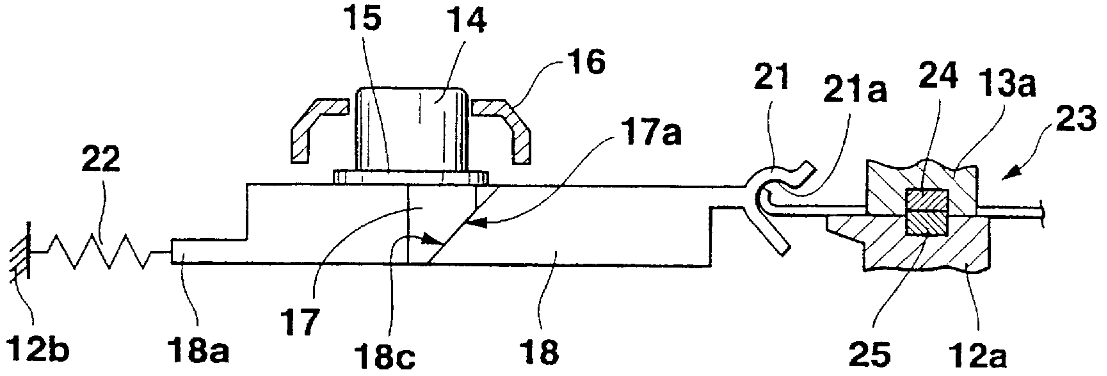

Then, the cover tape 31*b* is separated from the laminate tape 31, as shown in FIGS. 6A and B. When the push button 14 of FIG. 6A is pressed downward as shown by an arrow G from its initial positron, the moving assembly 18 moves forward or rightward, as described with respect to FIG. 3. Thus, the curved member 21 integral with the moving assembly 18 moves also forward or rightward to abut at its curved surface 21*a* on a corner of the label 31 to thereby push the label corner forward or rightward. FIG. 6B shows a state where the push button 14 is pressed downward to a maximum extent.

Figure 8:
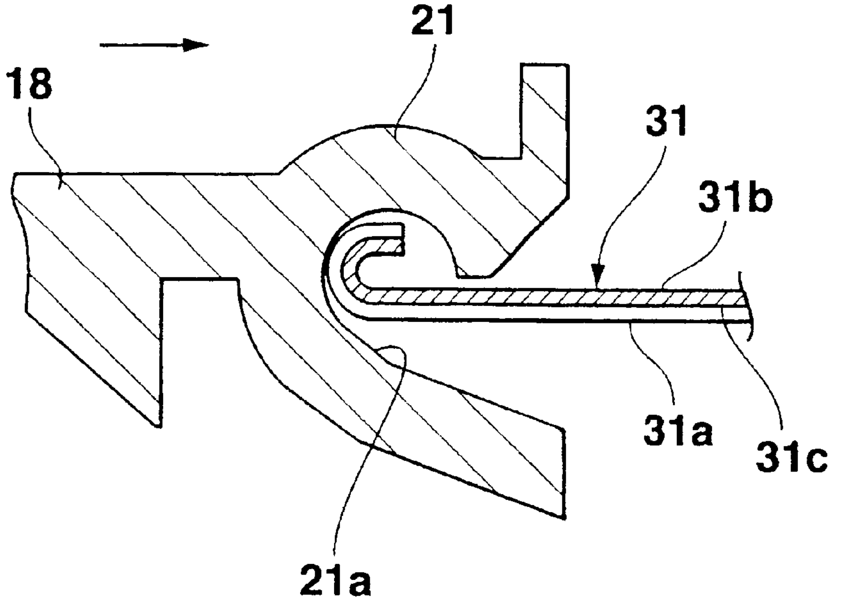
FIG. 8 illustrates in an enlarged view the relationship between the curved member and a label end in FIG. 6B.

Since the label 31 is fixed at the mouth 23, the label 31 cannot move backward or leftward and is bent or rolled up upwards at its corner along the curved member surface 21*a* by the pressing force which is applied by the curved member 21 because of the positional relationship between the label corner and the curved member 21 of FIG. 7 such that the printing tape 31*a* and the cover tape 31*b* take outer and inner positions, respectively, as shown in FIGS. 6B and 8.

As described in FIG. 3, when the moving assembly 18 is moved backward or leftwards by releasing the pressing force applied to the push button 14, the label 31 is restored to its state somewhat similar to that of FIG. 7. When the pushing and releasing operations of the push button 14 are repeated at least three times and preferably five times, a bend habit is formed in the corner of the label 31 depending on the width and material of the label 31.

Since the upper-limit (or initial) and lower-limit (or deepest pressed) positions of the push button 14 are determined by the abutting of the push button 14 on the button holder 16 and on the moving assembly 18, respectively, the strokes become constant through which the push button 14 is moved by repeatedly pressing the push button 14 downwards to its maximum degree, and the operational state of the push button does not change depending on the user.

Figure 9:
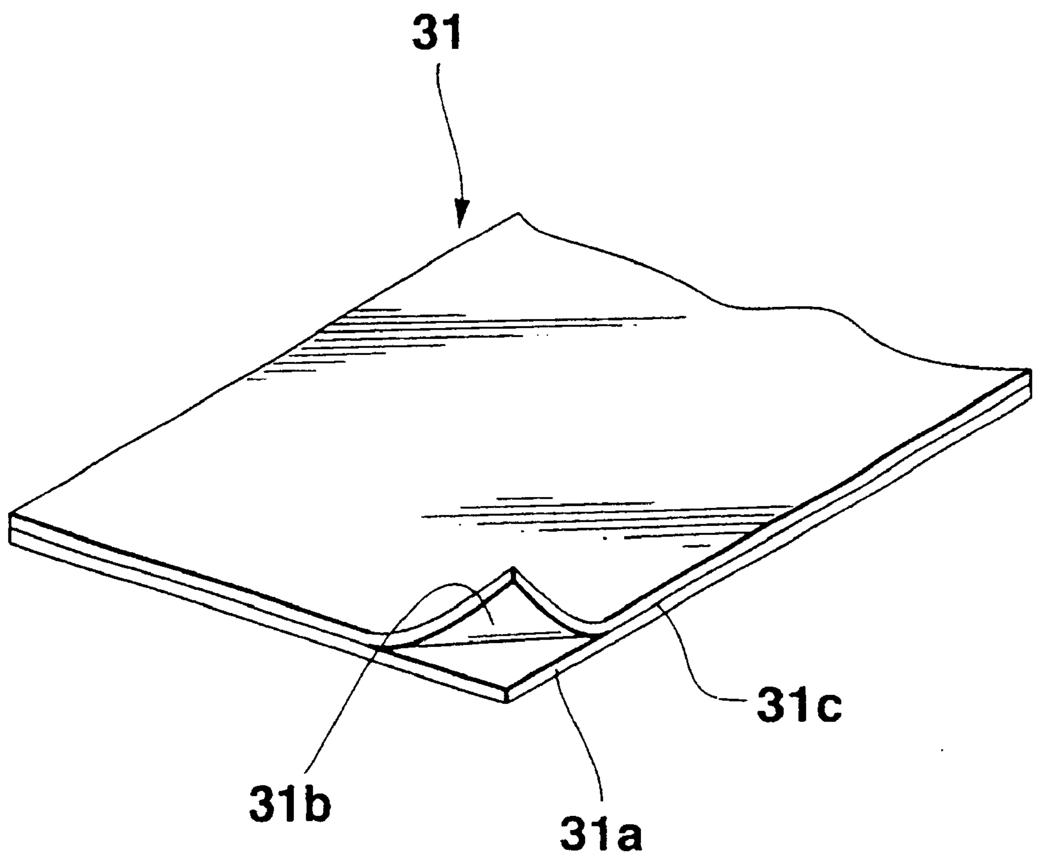
FIG. 9 is a perspective view of the label which has subjected to the separating process.

FIG. 9 shows a state of the label 31 taken out after the label 31 was subjected to the pushing and releasing operations of the push button 14 repeated several times and released by opening the mouth of the separator 10.

As shown in FIG. 9, in the label 31, the cover tape 31*b* is much bent upward at the corner concerned of the label 31 compared to the printing tape 31*a* which extends relatively straight because the printing tape 31*a* has a higher elasticity than the cover tape 31*b*. Thus, in this case, the cover tape 31*b* and the printing tape 31*a* can be easily separated from each other by pinching the respective separated corner portions of the label 31.

While in the inventive separator the moving assembly 18 is illustrated as moving at an angle of about 90 degrees to the moving direction of the push button 14, the arrangement may be such that the moving assembly 18 moves in the same direction as the push button 14 is operated.

A second embodiment of the separator which realizes such arrangement will be described now with respect to FIG. 10. The separator 40 also includes a lower case 41, an upper case 42 fixed to the lower case 41, and a seesaw cover 43 covering the lower and upper cases 41 and 42. A pair of protruding fulcrums 43*c* each are provided on a respective one of both the sides of the upper case 42 at a midpoint of its length and engaged in a corresponding pair of recesses 44 provided in a lower surface of the seesaw cover 43. A helical pull spring 45 is provided between the forward or rightward ends of the lower case 41 and the seesaw cover 43 so as to hinder the movement of the moving assembly 49 toward the mouth 48.

Figure 10:
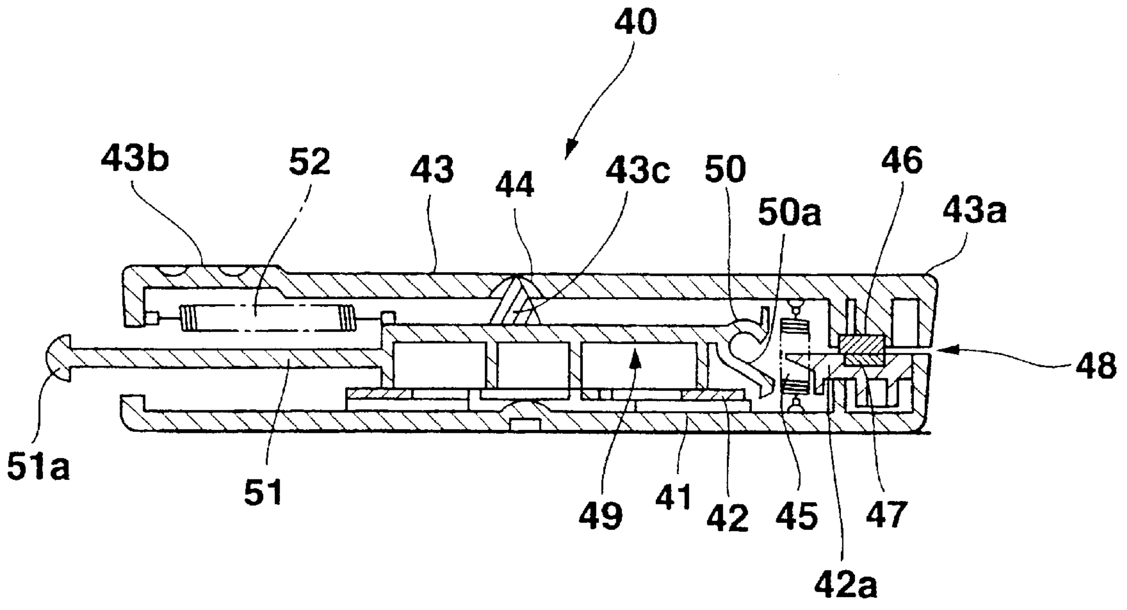
FIG. 10 is a cross-sectional view of another embodiment of the separator.
Figure 11:
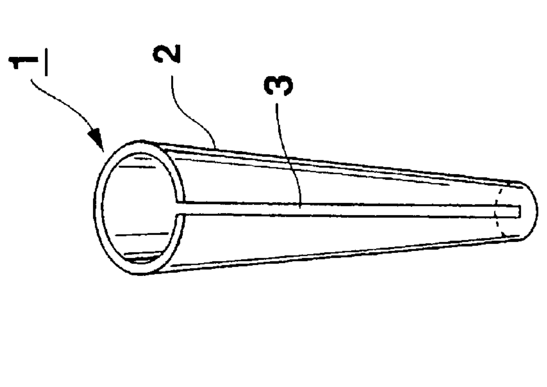
FIG.11 PRIOR ART
FIG. 11 shows one example of a conventional separator.

Thus, the seesaw cover 43 is always biased downward at its forward or rightward end 43*a* so as to turn clockwise around the pair of fulcrums 43*c* in FIG. 10, and to invariably press the elastic member 46 provided on the seesaw-cover forward end 43*a* against the elastic member 47 provided on the upper case 42. Thus, when the label is inserted at one end in position into the mouth 48, the label is clamped at that end by the forward or rightward ends 43*a* and 42*a* of the seesaw cover 43 and the upper case 42.

Although not shown, a pair of guides similar to the pair of guides 26*a* and 26*b* provided on the separator 10 of the first embodiment are provided on the forward or rightward end 42*a* of the upper case 42 within the mouth 48.

A moving assembly 49 is provided between the pair of fulcrums 43*c* each provided on the upper case 42 at a midpoint of its length such that the moving assembly 49 is movable forwards and backwards (or rightward or leftward) along a pair of guiding rails (not shown) provided on the separator. The moving assembly 49 has a curved member 50 with a curved surface 51*a* at its forward or rightward end like the moving assembly 18 of the first embodiment, and also has an operating rod 51 with a knob 51*a* which normally extends outside from the backward or leftward end of the separator 40. A helical pull spring 52 is provided between the backward or leftward end of the moving assembly 49 and the inner surface of the backward or leftward end 43*b* of the seesaw cover 43.

In the separator 40, by pressing the seesaw cover 43 downward at its backward or leftward end 43*b*, the mouth 48 is opened against the pull spring 45. Then, the label is inserted at one end into the mouth 48, and the pressing force applied to the backward or leftward end 43*b* of the seesaw cover 43 is released to cramp the label. Then, the knob 51*a* is pressed into the separator to move the moving assembly 49 toward the mouth 48 to thereby cause the curved member 50 provided at the forward or rightward end of the moving assembly 49 to abut on a corner of the inserted label. When the pressing force applied to the knob 51*a* is released, the moving assembly 49 is returned to its original position by the resiliency of the helical pull spring 52. By repeating the pressing and releasing operations of the knob 51*a* several times in this way, the label as shown in FIG. 9 is obtained in the separator 40 as in the separator 10.

While in the above embodiments a label which is obtained by cutting a printed portion away from a printing laminate has been illustrated, the present invention may be applicable to a predetermined-sized rectangular laminate which includes a printing sheet and a cover sheet attached through an adhesive layer to the printing sheet.

What is claimed is:

1. A separator for separating a cover sheet from a printing laminate which includes a printing sheet and the cover sheet mutually having different rigidity, attached separably to the printing sheet, comprising:

mouth means through which the printing laminate is inserted;

curved means having a curved surface provided deep within the mouth means; and moving means for moving said curved means toward said mouth means to cause said curved means to push at the curved surface a leading end of the inserted printing laminate to thereby curve the laminated printing sheet, and wherein said curved means comprises a curved surface which is moved toward said mouth means plural times by said moving means, thus contacting at least one surface of the laminated printing sheet and bending a leading end of said laminated printing sheet, thereby separating the cover sheet from the printing sheet utilizing the differences of the rigidity.

2. The separator according to claim 1, further comprising clamping means for clamping the printing laminate at a predetermined position.

3. The separator according to claim 2, further comprising biasing means for biasing said clamping means toward the predetermined position so as to clamp the printing laminate at the predetermined position.

4. The separator according to claim 1, wherein said moving means comprises a moving member and an operative member operated for moving said moving member at about 90 degrees to a direction in which said operative member is operated.

5. The separator according to claim 4, wherein said operative member comprises a sliding surface where said operative member is in contact with said moving member such that a force applied to said operative member is converted by said sliding surface of said operative member to a force applied to said moving member so as to move said moving member toward the leading end of the printing laminate, the force applied to said operative member being at about 90 degrees to the direction of the force applied to said moving member.

6. The separator according to claim 1, wherein said moving member comprises an operative member and a moving member integral with said operative member, and wherein said operative member and said moving member have the same moving direction.

7. The separator according to claim 6, wherein said moving member is integral with said curved means.

8. The separator according to claim 1, wherein said mouth means comprises a pair of guides for guiding the printing laminate and disposed at an angle of 30–60 degrees to the direction in which the printing laminate is inserted at the leading end into said mouth means.

* * * * *